Feb. 18, 1958   J. R. OISHEI   2,823,407
WINDSHIELD WIPER DRIVE AND CONTROL MECHANISM
Filed Sept. 9, 1952   3 Sheets-Sheet 1
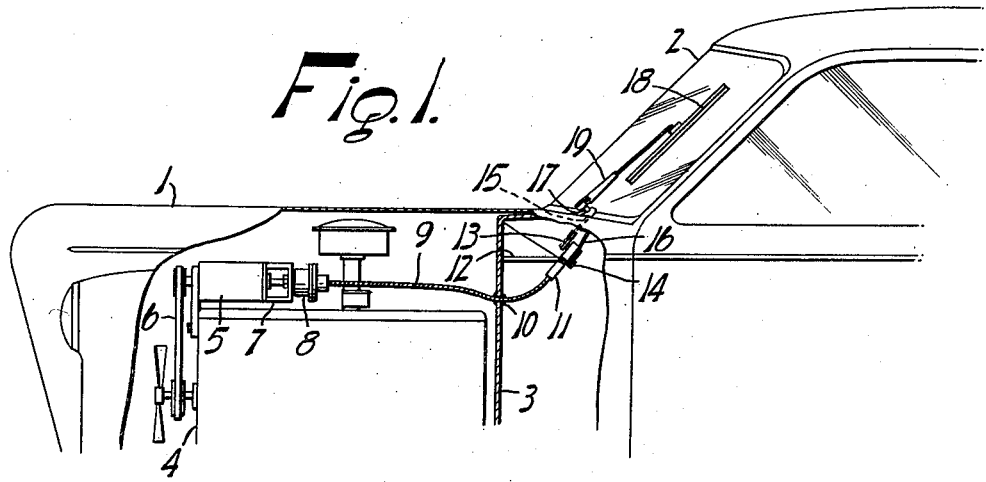
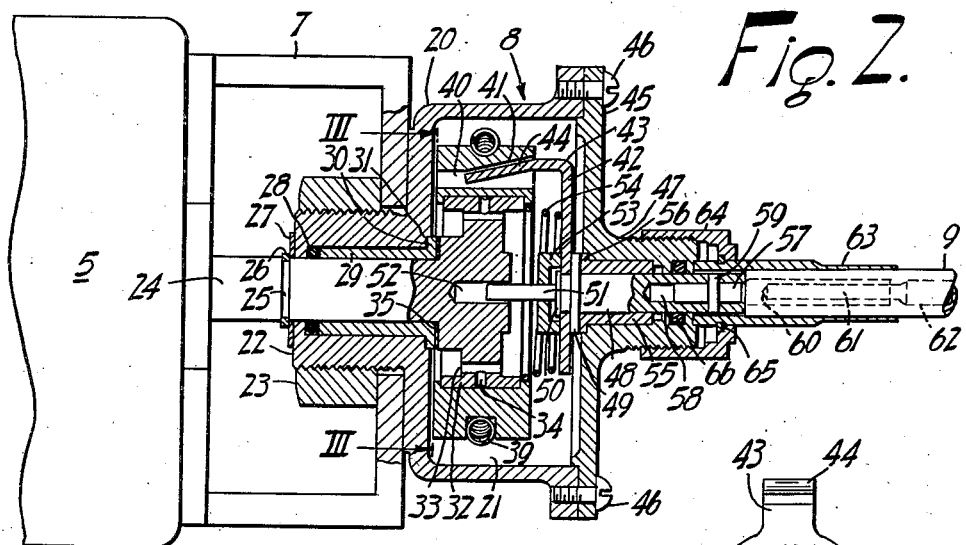
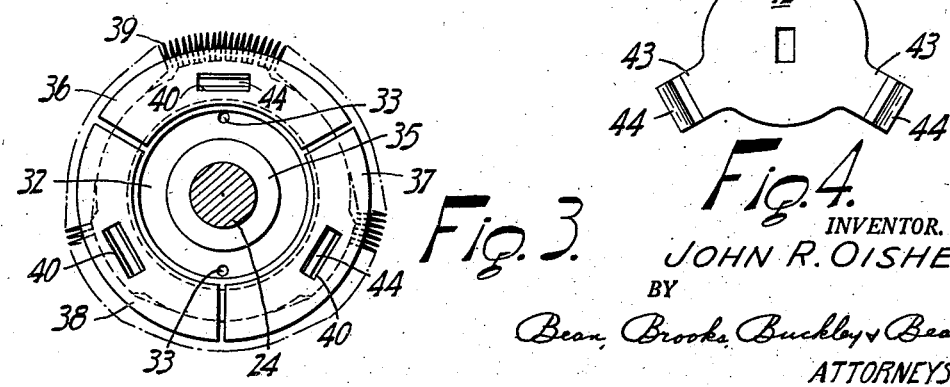
INVENTOR.
JOHN R. OISHEI
BY
Bean, Brooks, Buckley & Bean
ATTORNEYS Feb. 18, 1958  J. R. OISHEI  2,823,407
WINDSHIELD WIPER DRIVE AND CONTROL MECHANISM
Filed Sept. 9, 1952  3 Sheets-Sheet 2
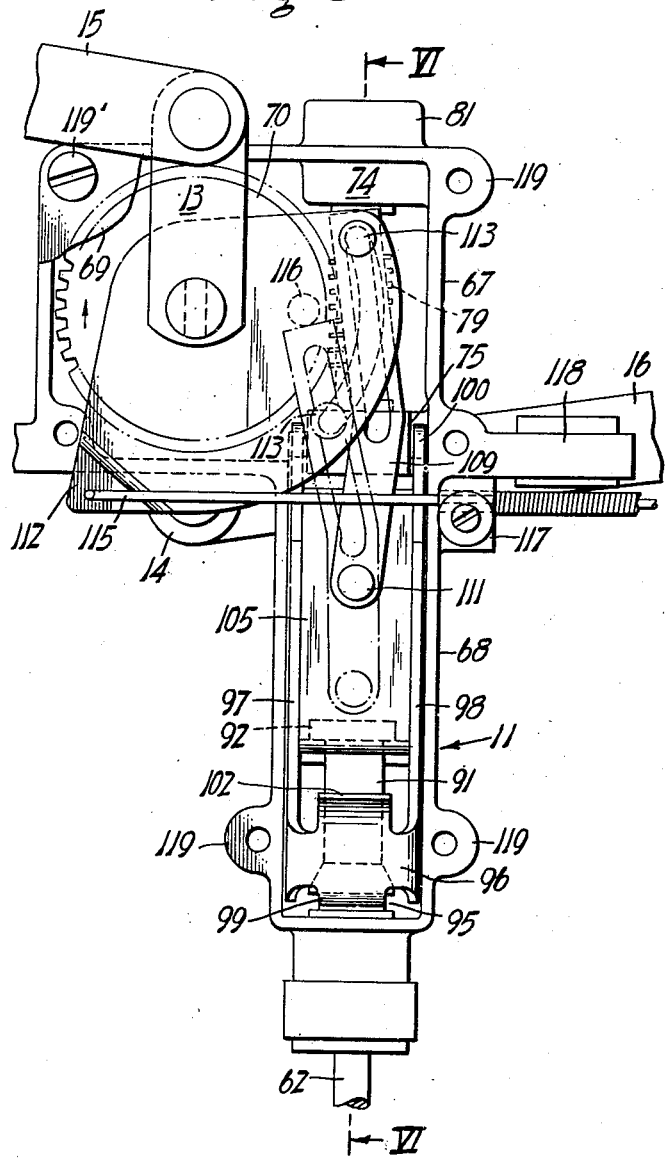
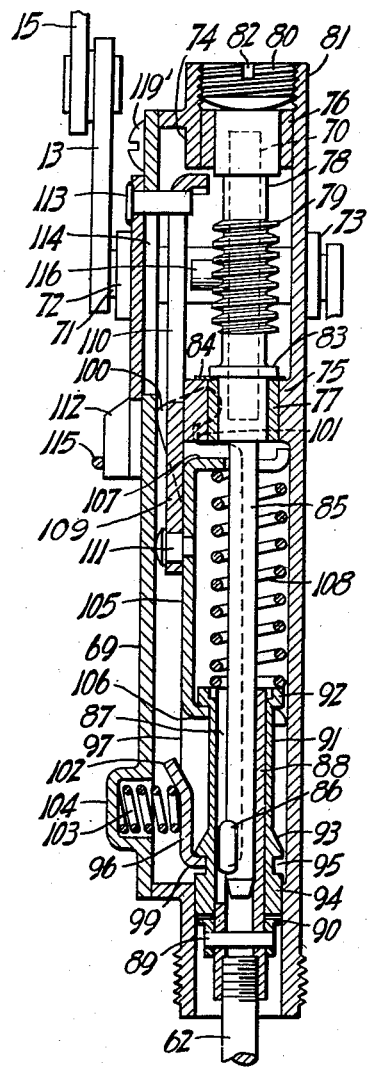
INVENTOR.
JOHN R. OISHEI
BY
Bean, Brooke, Buckley & Bean.
ATTORNEYS

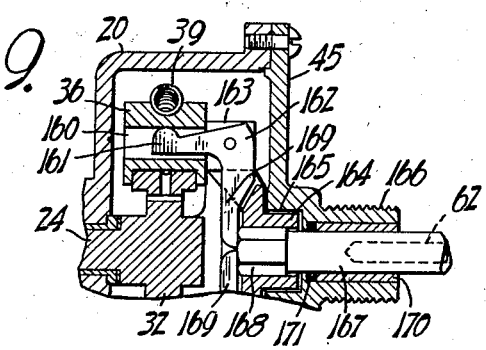
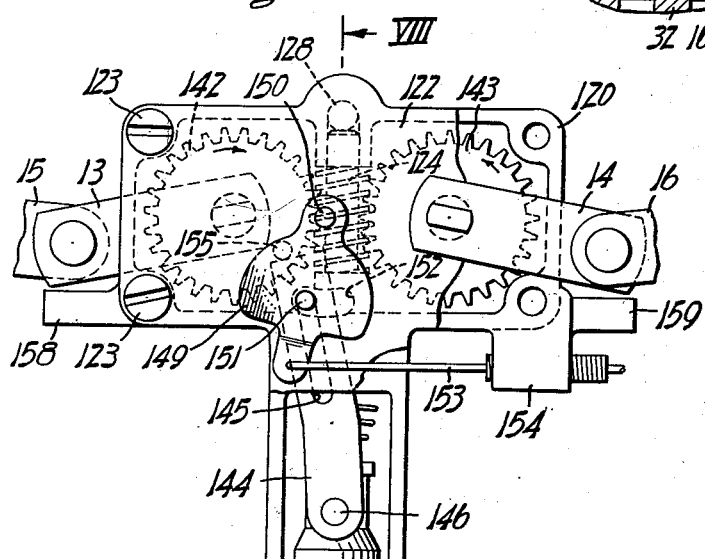
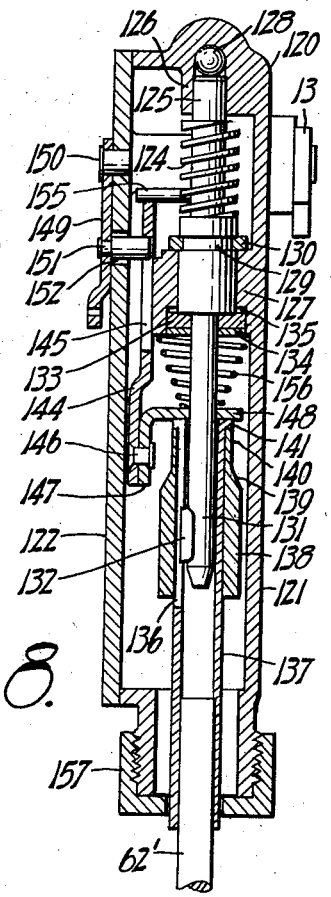

United States Patent Office 2,823,407
Patented Feb. 18, 1958

2,823,407

WINDSHIELD WIPER DRIVE AND CONTROL MECHANISM

John R. Oishei, Buffalo, N. Y., assignor to Trico Products Corporation, Buffalo, N. Y.

Application September 9, 1952, Serial No. 308,634

12 Claims. (Cl. 15—253)

This invention relates generally to the windshield cleaning art, and more particularly to a mechanically driven windshield cleaner, i. e. one driven from a moving part of the power plant of the vehicle, such as is exemplified in Patent No. 2,119,510. In such earlier disclosure a speed responsive disconnect was employed in an effort to maintain a uniform maximum wiper speed but it was found that in practice it was difficult to control the wiper speed.

The primary object of this invention is to provide an improved windshield cleaner of this type in which a predetermined wiper speed is more readily secured for better wiper performance.

A further object of this invention is to provide a mechanically driven windshield cleaner incorporating time controlled means which are effective in causing the wiping element to assume a predetermined parked position in a practical manner.

A still further object of this invention is to provide a mechanical windshield cleaner having improved speed regulating means which may be so disposed as to definitely disconnect the wiping element from its drive when the wiper is parked.

Another object of this invention is to provide a mechanical windshield cleaner having means for minimizing stress and wear on a rotating drive cable and one which is relatively inexpensive to manufacture, simple in construction, and positive in operation.

These and other objects will become apparent as the following detailed description progresses, which description should be read together with the accompanying drawings, wherein:

Fig. 1 shows the windshield cleaner of the present invention installed on a vehicle;

Fig. 2 is a detail view, partly in section, of the disengageable clutch of the cleaner driving mechanism;

Fig. 3 is a view, partly in section, taken along the line III—III of Fig. 2 and showing how the clutch shoes are arranged around the clutch drum;

Fig. 4 is a front view of the cam member used in disengaging the clutch mechanism;

Fig. 5 is a view showing the means for converting the rotary motion of a flexible drive cable into an oscillatory motion to drive the wiper elements, together with the parking means;

Fig. 6 is a sectional view taken along the line VI—VI of Fig. 5;

Fig. 7 is a view of a modified form of converter means;

Fig. 8 is a sectional view along the line VIII—VIII of Fig. 7; and

Fig. 9 is a detail sectional view of the disengageable clutch mechanism showing a modified form of member used to lift the clutch shoes from the clutch drum.

Fig. 1 shows the windshield cleaner of the instant invention installed on a vehicle 1, which vehicle has a windshield 2, a firewall 3, an engine block 4, and a generator 5 driven from the engine by a belt 6. The rear end of the generator 5 has a bracket 7 carrying a clutch housing 8 from which latter extends a flexible shaft armor 9 to pass through a grommet 10 in the firewall and on to a converter mechanism generally indicated at 11. This converter mechanism is mounted by a bracket 12 on fire-wall 3 and has a plurality of drive arms 13 and 14 to which are attached connecting links 15 and 16 that extend to a plurality of wiper oscillating rockshafts, one of which is illustrated at 17. A wiping element 18 is carried by a wiper drive arm 19 which in turn is mounted on the exterior end of rockshaft 17.

Referring now to Fig. 2, it is seen that clutch housing 8 comprises an enlarged body portion 20 having a chamber 21 therein and a hollow threaded boss 22 on one end. The chambered body portion 20 fits against bracket 7 and the boss 22 extends therein to receive a clamping nut 23 for anchoring the housing 8 thereto. The shaft 24 which may be a part of the generator shaft extends through the boss into the chamber 21, and has a circumferential groove 25 to receive a locking ring 26 for holding a washer 27 against the end of boss 22. A sealing ring 28 fits around drive shaft 24 inside hollow boss 22, and a bushing 29 is arranged in the latter to support the shaft 24, the bushing having a flange 30 fitting within a circumferential recess 31. A driving clutch drum 32 is fixed on or forms a part of the shaft 24. Oil ducts 33 and 34 provide for supplying a lubricant to the periphery of the drum. A washer 35 is interposed between flange 30 and the drum 32.

Driven clutch shoes 36, 37 and 38, illustrated as being three in number although of course any desired number may be used, are arranged about the drum to seat upon and grip its periphery where they are releasably held by an annular spring 39 fitting within a groove in the outer circumference of each of said clutch shoes.

Each of clutch shoes 36, 37 and 38 has an opening 40 extending therethrough in a direction parallel to the longitudinal axis of shaft 24, and each of said openings is tapered outwardly at the rearward portion thereof so as to present a cam surface 41. A spider-like cam member 42 has a plurality of fingers 43, each of which is adapted to extend within one of openings 40 and each of which is inclined at its forward end to provide a cam surface 44 complementary to surface 41. Thus it will be seen that as cam member 42 is pushed axially in the housing 8, cam surfaces 41 and 44 will cooperate to lift clutch shoes 36, 37 and 38 off and away from clutch drum 32 against the action of spring 39. A reverse axial movement will release the annular series of clutch shoes to be contracted upon the drum by the encircling spring. This arrangement establishes a play connection between the cam member and the shoes which insures a freedom of action of the shoes under the centrifugal force. In this connection it will be noted that the shoes are held on the clutch drum and guided radially with respect thereto by their lateral flanges so that the camming fingers 43 may function smoothly without dragging the shoes laterally.

A cover plate 45 closes the housing chamber 21, being secured to the housing by means of a plurality of bolts 46. The cover plate has a hollow, exteriorly threaded boss 47 on its outer face through which extends a shaft 48 having a circumferential flange 49 near its inner end. Cam member 42 fits on shaft 48 and against flange 49, and is held in place thereon by peening shaft 48 as at 50. An elongate guide 51 extends from the inner end of shaft 48 into an axial recess 52 in drum 32, and a cupshaped member 53 designed to abut drum 32 whereby to limit the forward movement of cam member 42 fits over guide 51. A spring 54 extends between drum 32 and cam member 42 to bias the same apart. Thus, cam member 42 is moved forwardly to disengage the clutch mechanism, and is returned to its rearward position to engage said clutch mechanism, all in a manner to be described.

A bushing 55 fits within the boss 47 to support the shaft, and has an annular flange 56 engaging in an annular groove in boss 47 and abutting flange 49. A connecting link 57 is secured at one end within a recess 58 of shaft 48 by a pin 59, and has its opposite end enlarged and recessed, as at 60, to receive a reduced end portion 61 of a flexible shaft or cable 62. Link 57 and portion 61 of cable 62 are swaged together so as to provide a tight connection therebetween, and are enclosed by armor 9. An anchor sleeve 63 is connected to armor 9 at this point, and is secured to boss 47 by a cup-shaped nut 64 which threadedly engages boss 47. A washer 65 engages the nut 64 and is fitted in a groove in sleeve 63 to hold the same in proper relative position. Also, a sealing ring 66 extends between shaft 48 and boss 47, being held in place by means of flanges on the interior of boss 47.

The converter 11 of Figs. 5 and 6 comprises an open-sided housing 67 having an extension 68 thereon and a cover plate 69 attached thereto. Housing 67 contains a spur gear 70 having a shaft 71 extending through bearings 72 and 73 in cover plate 69 and housing 67 respectively, and drive arms 13 and 14 are connected to the ends of said shaft. Housing 67 also contains a pair of hollow bosses 74 and 75 containing bearings 76 and 77 in which the shaft 78 of a worm gear 79 is journaled. A plug 80 threadedly engages a raised boss 81 on housing 67 and is brought into abutment with the upper end of worm shaft 78, as by turning it with a tool engaged in a groove 82, which latter also permits the removal of the plug to facilitate the removal of worm gear 79 when desired. Shaft 78 has a flange 83 overlying the bearing 77, with a washer 84 fitting between flange and bearing to provide thrust support for the worm 79.

The worm shaft 78 has a shaft extension 85 attached to or integral therewith, which ever may be desired, which shaft extension has a key 86 fitting within a slot 87 of a sleeve 88 that is secured to the end of flexible cable 62. A pin 89 extends through sleeve 88, and secures a collar 90 thereto. Thus, the rotary motion of flexible cable 62 is transmitted to drive arms 13 and 14 through shaft 85, worm 79 and spur gear 70, and is converted into an oscillatory motion by the action of the drive arms and the connecting linkage. This same rotary motion is also used to disengage the clutch and park the wiper in the following manner.

A tubular keeper element 91 fits around sleeve 88, and has a flange 92 at one end thereof. Near its other end, the keeper element is tapered outwardly at 93 to an enlarged end portion 94 having an annular groove 95 therein. A trigger member 96 having guides 97 and 98 extending along the edges of extension 68 of housing 67 fits within said extension and has an inturned flange 99 at its lower end which fits within groove 95. The guides 97 and 98 are forked at their upper ends, one such end being shown at 100, and said forked ends fit over a flange 101 on boss 75, whereby said ends cooperate with said boss and cover member 69 to act as a fulcrum when the trigger member is pivoted. Trigger member 96 has an outturned flange 102, and a spring 103 extends between the trigger member and a boss 104 on cover plate 69, which spring tends to bias the trigger member and flange 99 into locked relation with element 91 and groove 95. A slidable plate 105 extends between guides 97 and 98, and has a forked flange 106 at its lower end extending inwardly beneath flange 92 and around the keeper element. Plate 105 has a similar forked flange 107 at its upper end, and a spring member 108 extends between flange 107 of plate 105 and flange 92 of tubular element 91.

A link 109, having a slot 110 along approximately the upper half of its length and being slightly bent at its midpoint, is pivoted at 111 to plate 105. A flat plate 112, shaped substantially in the form of a quadrant, is pivoted to bearing 72 and has a pin 113 thereon slidably extending through an arcuate slot 114 in cover plate 69 and into slot 110 in link 109. A Bowden wire 115, adapted to be manually actuated by the operator of the vehicle, is attached to plate 112 at the lower left-hand corner thereof, and serves to pivot plate 112 on bearing 72. The pivotal movement of plate 112 causes link 109 to be moved outwardly into the path of pin 116 on spur gear 70. Consequently, when the gear is rotating the moving pin 116 will engage the projecting end of the link 109 to force it and plate 105 downwardly against the action of spring 108 to the broken line position of Fig. 5. In this manner, potential energy is initially stored up in spring 108 until plate 105 cams against flange 102 of trigger 96, lifting the same to disengage flange 99 from groove 95 whereupon the potential energy stored up is released, forcing the keeper element 91, with the collar 90, sleeve 88 and cable 62 downwardly to disengage the clutch mechanism and arrest the windshield cleaning operation. Sleeve 88 slides along shaft 85, with key 86 sliding along groove 87. The Bowden wire 115 is held in place by a guide member 117, and housing 67 is provided with an ear 118 serving for attachment on bracket 12. Cover plate 69 is attached to ears 119 on housing 67 by any conventional means such as screws 119'.

The operation of this windshield cleaner is as follows. The cleaner is illustrated in running position, with generator shaft 24 imparting rotation to flexible cable 62 through clutch drum 32, clutch shoes 36, 37 and 38, cam member 42 and shaft 48. Flexible cable 62 in turn rotates worm 79 through slotted sleeve 88, key 86, shaft 85 and worm shaft 78, and worm 79 drives spur gear 70. Spur gear 70 acts through shaft 71 to rotate drive arms 13 and 14 which in turn drive connecting links 15 and 16 to impart an oscillatory motion to the wiper elements.

When it is desired to arrest the windshield cleaning operation, Bowden wire 115 is pushed inwardly, to the left in Fig. 5, causing plate 112 to rotate in a clockwise direction with pin 113 moving link 109 to project it into the path of pin 116 on spur gear 70. When pin 116 engages the link 109 and depresses it to cause plate 105 to compress spring 108 and store up energy therein the flange 106 will bear against flange 102 of trigger member 96 to cam it outwardly against the influence of spring 103, with the forked ends of guides 97 and 98 fulcruming upon the cover plate 69. This pivoting action will cause flange 99 of the trigger to disengage the keeper and release the stored up energy in spring 108 to axially shift the flexible cable 62 downwardly out of extension 68 with considerable force. Flexible cable 62 will in turn act to drive cam member 42 inwardly against the action of spring 54 and cause the surfaces 44 on fingers 43 to lift clutch shoes 36, 37 and 38 off clutch drum 32 against the action of spring 39. At this point the clutch mechanism is disengaged and the windshield cleaning operation is arrested, the parts being so arranged that the wiper elements will assume a position of rest adjacent the bottom edge of the windshield.

When it is desired to initiate a windshield cleaning operation, Bowden wire 115 is manually pulled, to the right as viewed in Fig. 5, rotating plate 112 counter-clockwise and moving the link 109 out of the path of pin 116. A continued pull upon the Bowden wire will lift on the link and, through the forked flange 106 of plate 105, pull upwardly on flange 92 of the keeper element 91, restoring these parts, together with spring 108 and trigger member 96, to the position illustrated in Fig. 6. At the same time, spring 54 will push cam member 42 rearwardly and permit the clutch shoes to engage under the influence of spring 39, with the flexible cable 62 being in its illustrated position.

Also, the clutch mechanism has a governor action which tends to maintain a given speed of normal operation for the wiping elements substantially constant regardless of a higher speed of rotation of the generator shaft. Spring 39 is of sufficient strength to hold clutch shoes 36, 37 and 38 tightly against the clutch drum at low sub-normal speeds. The speed of rotation of drive shaft 24 varies with engine speed, and this variation of speed would normally be transmitted to the wiper elements. However, in the instant invention, spring 39 is so designed that, while it is of sufficient strength to hold clutch shoes 36, 37 and 38 tightly against clutch drum 32 at sub-normal speeds, as the rotary speed of the clutch mechanism increases, clutch shoes 36, 37 and 38 will move outwardly under the influence of centrifugal force, against the influence of spring 39, to hold the wiper speed at a predetermined maximum for normal operation.

A modified form of converter is illustrated in Fig. 7, and comprises a housing 120 having an extension 121, and a cover plate 122 secured on housing 120 and extension 121 by means of bolts 123. A worm gear 124, having a shaft 125, is journaled in bearings 126 and 127, with the upper end of shaft 125 bearing against a thrust receiving ball bearing 128. Shaft 125 is grooved at 129 to receive a washer 130 for support upon the top portion of bearing 127.

Shaft 125 has a lower end portion 131 with a key element 132 integral therewith while washer elements 133 and 134 receive the shaft and fit within a recess 135 in bearing 127. Key 132 slidably engages in slot 136 of sleeve 137 which latter surrounds the shaft extension 131 and is securely attached to the flexible drive cable 62'. A tubular element 138 fits around sleeve 137, and is tapered at 139 to an end portion 140 of reduced diameter which bears against a flange 141 on the upper end of the sleeve.

Two spur gears 142 and 143 are mounted in housing 120 on opposite sides of worm 124 and in driven engagement therewith. Drive arms 13 and 14 are mounted to rotate with the spur gears 142 and 143, respectively, and are joined to connecting links 15 and 16 to oscillate the wiper shafts 17 as previously described. A link 144 having a slot 145 therein is pivoted at 146 to a depending flange 147 on a plate 148, which latter fits around the shaft extension 131 and seats upon flange 141 of sleeve 137, said link being somewhat bent at approximately its midsection. A plate 149 is pivoted at 150 to cover plate 122, and has thereon a pin 151 which extends inwardly through an arcuate slot 152 in the cover plate and into slot 145 in link 144. A Bowden wire 153, anchored in a block 154 on the housing, is connected at one end to plate 149 for being manually operated to swing the latter for positioning the link 144 in the path of a pin 155 on spur gear 142 whereby the pin may shift the link lengthwise to declutch the wipers. A light spring 156 may be interposed between the plate 148 and the bearing 127. A cap 157 is threadedly engaged on the end of extension 121 and ears 158 and 159 serve for attaching housing 120 to bracket 12.

The operation of this modified converter mechanism is as follows. The device is illustrated in arrested position, with sleeve 137 depressed and the spring 54 compressed. To start the wipers, Bowden wire 153 is pulled to the right as viewed in Fig. 7. This will pivot plate 149 in a counter-clockwise direction, causing pin 151 to pivot link 144 out of the path of pin 155 whereupon plate 148 and sleeve 137 will move upwardly, under the influence of spring 54, to displace the cam member 42 and cause the clutch shoes 36, 37 and 38 to engage clutch drum 32 under the influence of spring 39. The rotary motion of the flexible cable 62' will be imparted to worm gear 124, and consequently to the spur gears 142 and 143, through sleeve 137, key 132, and shaft 125. In this way, the rotating cable will drive connecting links 15 and 16 to oscillate the wiper blades back and forth across the windshield.

When it is desired to arrest the windshield cleaning operation, the Bowden wire 153 is pushed inwardly, to the left in Fig. 7, to pivot plate 149 in a clockwise direction for positioning the link 144 in the path of pin 155. The pin 155 on its next cycle will depress the link, shift the flexible cable and effect the desired declutching. The driving motion of the windshield cleaner is used to disengage the clutch mechanism and park the wiper in the manner previously described. The mechanism is arranged so that the wiper blades will assume a position of rest adjacent the bottom edge of the windshield.

A modified form of clutch mechanism is illustrated in Fig. 9, wherein the previously described housing 20, cover 45, generator shaft 24, clutch drum 32, clutch shoes 36, 37 and 38, and spring 39 remain the same. Each of said clutch shoes, only one of which is illustrated, has an opening 160 therein, into which opening extends one end 161 of an L-shaped lifting member 162. Said lifting members, or bell cranks, are pivotally carried by a spider 163 which has a hollow boss 164 thereon the interior of which is configurated, as by being six-sided. Cover plate 45 is recessed at 165 to receive boss 164, and has an exteriorly threaded hollow boss 166 thereon. A link 167 extends through hollow boss 166 and has an appropriately configurated end portion 168 which fits within boss 164 and is adapted to bear against the other end 169 of lifting members 162. At its other end, link 167 is secured around one end of flexible cable 62. A bushing 170 fits within boss 166 and around link 167, and a sealing ring 171 bears against the inner end of said sleeve 170.

In operation, as generator shaft 24 and clutch drum 32 rotate, they rotate the clutch shoes in the manner previously described. The rotary motion of the clutch mechanism is transmitted to flexible cable 62 through members 162, spider 163, boss 164, end portion 168 and link 167. When it is desired to arrest the windshield cleaning operation, flexible cable 62 is pushed inwardly in the manner previously described, causing end portion 168 to bear against ends 169 of levers 162 and pivot the same, whereupon ends 161 of levers 162 will lift the clutch shoes from the clutch drum against the action of spring 39, thus disengaging the clutch mechanism. It is noted that spring 39 and the clutch shoes and drum serve as a speed governor, and flexible drive cable 62 extends through hollow armor 9, all in the manner previously described. Also, it is obvious that either of the clutch mechanisms can be used with either of the converter mechanisms.

In each form of the invention the clutch shoes are spaced radially outward from the periphery of the driving drum 32, being lifted outwardly by the camming parts 41, 44 and the levers 162. Not only are the shoes lifted off the periphery of the drum but they are held supported thereby whenever the wipers are parked. Each of these shoe lifting arrangements embody a play connection which permits the parts to radially respond to centrifugal force.

When the wipers are parked the constantly rotating drive shaft will be wholly declutched from the transmission by reason of the fact that the clutch shoes are supported outwardly from the clutch drum by the fingers 43, this spacing being accomplished positively in the embodiment of Figs. 7 and 8, and resiliently in the embodiment of Figs. 5 and 6. The parking is through the presetting of the time controlled units of either Figs. 5 or 7 to displace the clutch shoes radially against the centripetal action of the encircling spring 39. In normal wiper operation the spring contracted clutch shoes serve as a slip connection between the drive 24 and the wipers to maintain the desired normal speed of wiper movement.

The present invention fully accomplishes its aforesaid purposes and provides a mechanically driven windshield cleaner which will perform efficiently in wiping the windshield surface and in parking the wipers thereon, and since other modifications will become apparent to those skilled in the art, it is intended to cover all such modifications in the appended claims.

What is claimed is:

1. In a windshield cleaner, a wiper transmission including a speed responsive clutch having a rotatable drive member and driven clutch shoe means resiliently engaging the periphery of said drive member and movable radially outwardly from clutching engagement therewith relative to the axis of rotation thereof, a rotatable shaft part having limited axial movement, and shoe displacing means operatively connecting the shaft part to the clutch shoe means and operable upon axial movement of the shaft part in one direction to so move said shoe means outwardly from clutching engagement with said drive member and to support said shoe means in disengaged position for holding the transmission interrupted.

2. A windshield cleaner comprising a wiper, a transmission for said wiper including a speed responsive clutch having a drive member and driven clutch shoe means resiliently engaging said member around the periphery thereof and movable generally radially outwardly from clutching engagement therewith, a rotatable shaft including a part having limited axial movement, shoe displacing means operatively connecting the shaft part to said clutch shoe means and operable upon axial movement of the shaft part in one direction to lift said shoe means generally radially outwardly completely off said drive member out of clutching engagement therewith and to support said shoe means in such disengaged position, means operatively connecting said wiper to said rotatable shaft for movement thereby through a predetermined cycle, and time controlled means operable at a definite point in the wiper cycle of movement to so move the shaft part axially for parking the wiper.

3. A windshield cleaner wiper transmission including a speed responsive clutch having a drive member and driven clutch shoe means resiliently engaging said member around the periphery thereof and movable outwardly from clutching engagement therewith, a rotatable shaft part having limited axial movement, and shoe displacing means operatively connecting said shaft part to said clutch shoe means and operable upon axial movement of said shaft part to lift said shoe means generally radially outwardly completely off said drive member out of clutching engagement therewith and to support said shoe means in such disengaged position for holding the transmission interrupted, there being a play connection between the shoe displacing means and the shoe means to permit centrifugal response of the latter.

4. In a windshield cleaner, a drive shaft, a rotary transmission including a flexible cable for connecting said shaft to a wiper and a part mounted for endwise movement, rotatable driving means comprising disengageable clutch elements, one of said elements being connected to the drive shaft and the other thereof being connected to one end of said part, said other element being displaceable radially outwardly from said one element upon endwise movement of said part to disengage said elements, wiper attachment means at the opposite end of said transmission, and preset means utilizing energy derived from the rotation of said part to produce endwise movement thereof for disengaging said clutch elements to arrest the rotary motion of said transmission.

5. In a windshield cleaner system, rotating driving and driven parts operable to drive a wiping element, said driven part having clutch shoes displaceable radially outwardly from the axis of rotation of said driven part and controlled by the centrifugal force generated by the rotation of said driven part and by a regulatable centripetal force applied thereto for modifying the speed of rotation transmitted from said driving part to said driven part, and transmission means for connecting the driven part to the wiping element and including a rotatable shaft and shoelifting means operable by the shaft to so displace the clutch shoes for arresting the system.

6. In a windshield cleaner, a driveshaft part mounted for rotational and endwise movement, rotatable driving means comprising disengageable elements, one of said elements being secured to one end of said driveshaft part and being disengageable from the other of said elements upon endwise movement of said driveshaft part, means for storing up potential energy derived from the rotation of said driveshaft part, and manually operable means effective to cause the rotation of said driveshaft part to release said stored up potential energy for causing endwise movement of said driveshaft part to disengage said disengageable elements and thereby arrest the rotation of said driveshaft part.

7. In a windshield cleaner, a drive shaft part mounted for rotational and endwise movement, coupling means comprising a continuously rotating part and an intermittently rotating part operatively connected to said drive shaft part, means biasing the parts of said coupling means into frictional engagement, and means for causing the rotation of said drive shaft part to produce endwise movement thereof disengaging said coupling means, said last-named means including cam means operatively connecting said intermittently rotating part to said drive shaft part and operable to support the former in a position of rest.

8. In a windshield cleaner, a flexible driveshaft having a part mounted for rotational and endwise movement, means for drivingly connecting one end of said driveshaft to a wiping element, rotatable coupling means having disengageable elements one of which elements being operatively connected to the driveshaft part, means biasing said elements into frictional engagement, and means utilizing energy derived from the rotation of said driveshaft for causing endwise movement of said part thereof to disengage said coupling means elements, said last-named means including a lever arm pivotal under the influence of endwise movement of said driveshaft part to separate said disengageable elements.

9. In a windshield cleaner, a rotatable flexible cable driveshaft having limited endwise movement within a casing, rotatable coupling means having disengageable elements, one of said elements being secured on one end of said cable, means for storing up potential energy derived from the rotation of said cable, and manually operable means to selectively cause endwise movement of said cable within said casing to engage and disengage said elements under the influence of said stored up potential energy.

10. A windshield cleaner drive means comprising a flexible driveshaft, a rotatable driving element, a driven element biased into engagement with said driving element, said driven element being provided with a beveled surface, a member driven by said driven element and secured to said flexible driveshaft, said member having an inclined extension with lost motion connection to the beveled surface and adapted to bear against the latter, and means utilizing the rotation of said driveshaft to cause said inclined extension to bear against said beveled surface to disengage said driven element from said driving element.

11. A windshield cleaner drive means comprising a flexible driveshaft, a rotatable driving element, a driven element releasably engaging said driving element, a pivotally mounted bell crank, one end of said bell crank being adapted to bear against and support said driven element spaced from the driving element and the other end of said bell crank being adapted for engagement with one end of said driveshaft, means utilizing said driving element to rotate said driveshaft, and means utilizing the rotation of said driveshaft to pivot said bell crank and disengage said driven element from said driving element.

12. In a windshield cleaner, a rotary shaft including a part having limited axial movement, a rotatable drive, a clutch element connecting the drive to the shaft part and being radially displaceable to declutch the latter, means operable by the shaft part in its axial movement to so displace the clutch element, and preset time-controlled means for connecting the shaft to a wiper and utilizing the rotation of said shaft to produce an endwise thrust of said shaft part to so declutch the shaft for stopping the cleaner, said displacing means when operative acting to support the clutch element radially spaced from the drive.

References Cited in the file of this patent

UNITED STATES PATENTS

| | | |
|---|---|---|
| 2,046,171 | Lauer | June 30, 1936 |
| 2,119,510 | Horton et al. | June 7, 1938 |
| 2,223,660 | Horton | Dec. 3, 1940 |
| 2,243,016 | Pritchard | May 20, 1941 |
| 2,581,313 | Van Der Woude | Jan. 1, 1952 |
| 2,667,249 | Bell et al. | Jan. 26, 1954 |
| 2,739,681 | Bowers | Mar. 27, 1956 |